July 21, 1931.  W. A. DEL MAR  1,815,706
METHOD OF IMPREGNATING CABLES
Filed May 7, 1928
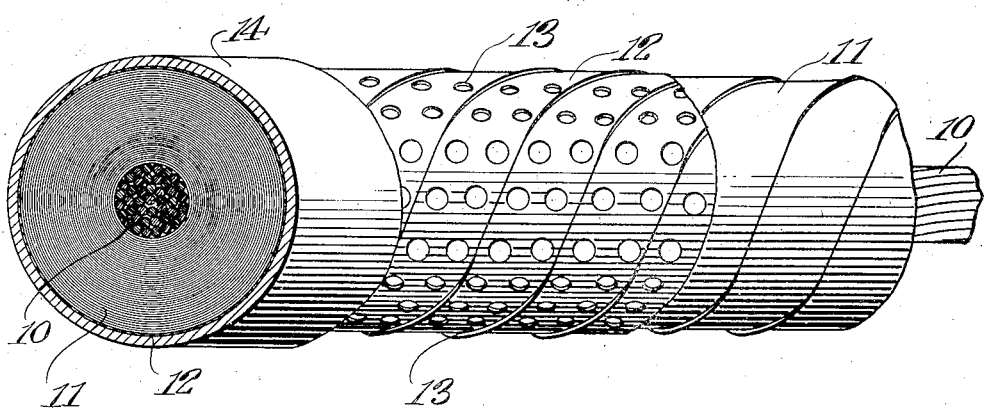
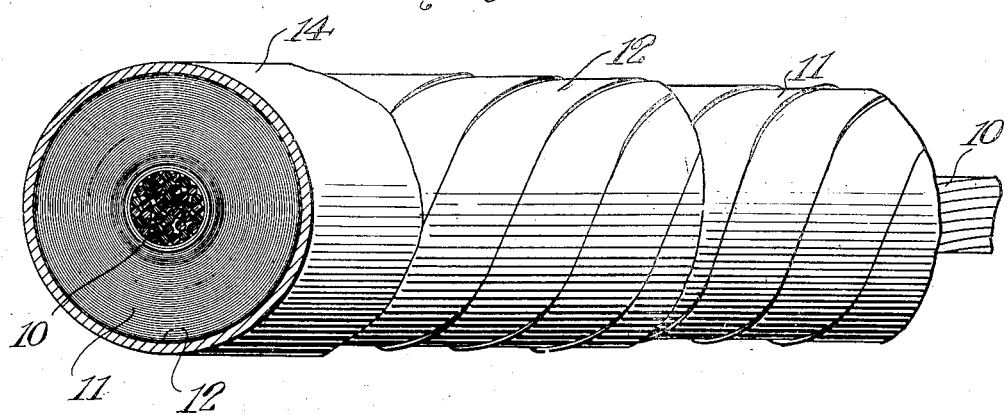
INVENTOR.
W. A. Del Mar
BY
Cooper, Kerr + Dunham
ATTORNEYS.

Patented July 21, 1931

1,815,706

UNITED STATES PATENT OFFICE

WILLIAM A. DEL MAR, OF GREENWICH, CONNECTICUT, ASSIGNOR TO HABIRSHAW CABLE & WIRE CORPORATION, OF NEW YORK, N. Y., A CORPORATION OF NEW YORK

METHOD OF IMPREGNATING CABLES

Application filed May 7, 1928. Serial No. 275,608.

This invention relates to electric cables comprising one or more conductors surrounded by fibrous or absorbent insulating material in turn surrounded by a layer or layers of material which ordinarily substantially prevents or impedes the introduction of liquid to the insulation through such last mentioned layer or layers.

It being desirable to improve the insulating function of the fibrous or absorbent insulating material and thereby increase the efficiency of the cable by adequate and proper impregnation, I have invented a method whereby such impregnation may be effectively and economically achieved.

According to my method, the fibrous or absorbent insulation is contracted and/or the surrounding layer or layers of material, which ordinarily prevent or at least impede passage of the impregnating material to the first mentioned material, is or are expanded, thereby permitting entrance of the impregnating material into extensive contact with the insulating material sought to be impregnated.

To facilitate disclosure and explanation of my novel method I shall refer to two of the simpler of the many other forms of cable to which it may be applied and shall disclose what I now consider the preferred manner in which to carry the invention into practice. It is to be understood however that it may be practiced in other ways and upon other cables within the scope of appended claims.

Referring to the drawings:—

Fig. 1 is a fragmentary longitudinal view, partly broken away, of a cable or partly finished cable to which the invention may be advantageously applied.

Fig. 2 is a similar view of a different form.

Referring to Fig. 1 it will be seen that the electrical conductor 10 (which may be and commonly is composed of a helically twisted group of copper or metallic wires) is wrapped with a helically wound lapping band or tape 11 of fibrous or absorbent insulating material such as paper, in turn surrounded by a helically wound lapping band or tape 12 of copper or other electrically conductive material which is substantially liquid-tight except at the perforations 13. Notwithstanding that the perforations 13 are provided, in the absence of further provisions, when the assemblage is placed in a bath of impregnating insulating liquid, such as suitable oil, the access of the insulating liquid to the absorbent material is not sufficiently complete within the permissible time to effect the desired thorough impregnation.

While my intended result may be achieved, at least in some cases, either by contracting the insulating material 11 or by expanding the surrounding layer 12, I prefer to do both and in the following way.

I subject the assemblage to dry heat to cause the moisture commonly contained therein (found in practice to be from four to eight per cent. by weight) to be driven off, and causing the paper to shrink in volume or contract. This application of heat simultaneously causes the metal tape 12 to expand. In this manner the paper 11 becomes relatively loose in its surrounding envelope 12 and by virtue of the expansion of the latter the turns of the material 12 become loose with respect to the paper and with respect to each other so that a multiplicity of inlet passages to the paper are provided, through not only the perforations 13 but between the turns of the tape 12, for the impregnating liquid. Furthermore, the latter is given immediate access to substantially the entire surface of the now dried paper 11.

The assemblage in this condition is placed in a bath of oil or other suitable impregnating liquid or compound which finds its way to the paper 11 and comparatively quickly and thoroughly impregnates the latter.

As the paper 11 becomes impregnated, it swells, filling the envelope 12 which contracts and closes upon cooling, the paper even tending to take more volume than its initial or original volume. The paper or insulation is, however, restrained or limited in its swelling by the rigidity of the envelope 12 and thereby put under considerable pressure, with the advantageous result of squeezing out any air that may be present and effecting complete impregnation.

The same method may be employed even when the tape 12 is imperforate as shown in Fig. 2. 14 indicates the usual lead sheath.

It will be understood that the degree of heat, the time of its application, the time of subjection to the impregnating material, and the rate of cooling to ordinary temperature, are all factors depending upon the type of cable being treated, the kind of materials employed, the degree of impregnation desired for that particular cable, etc. These factors will be within the skill of the average man in this art after reading the foregoing disclosures and explanations.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:—

1. The method of impregnating an absorbent envelope of fibrous insulating material surrounding an electrical conductor and in turn surrounded by an envelope consisting of a helically wound band of metal which ordinarily impedes passage of the impregnating material, which method comprises causing the first mentioned envelope to contract with respect to the second mentioned envelope by the application of dry heat, causing the second mentioned envelope to expand with respect to the said first mentioned envelope and to loosen the turns of the second mentioned envelope by the application of heat, subjecting the assemblage in such condition to impregnating liquid insulating material to cause the latter to pass through the second mentioned envelope into contact with the first mentioned envelope, causing the first mentioned envelope to expand, and causing the second mentioned envelope to contract, by cooling.

2. The method of impregnating an absorbent envelope of fibrous insulating material consisting of a helically wound band of paper surrounding an electrical conductor and in turn surrounded by an envelope consisting of a helically wound band of metal which ordinarily impedes passage of the impregnating material, which method comprises causing the first mentioned envelope to contract with respect to the second mentioned envelope by the application of dry heat, causing the second mentioned envelope to expand with respect to said first mentioned envelope and to loosen the turns of the second mentioned envelope by the application of heat, subjecting the assemblage in such condition to a bath of the impregnating liquid insulating material to cause the latter to pass through the second mentioned envelope into contact with the first mentioned envelope, causing the first mentioned envelope to expand, and causing the second mentioned envelope to contract, by cooling.

3. The method of impregnating an absorbent envelope of insulating material surrounding an electrical conductor and in turn surrounded by an envelope which ordinarily impedes passage of the impregnating material, which method comprises causing the first mentioned envelope to contract with respect to the second mentioned envelope, and subjecting the assemblage in such condition to impregnating insulating material to cause the latter to pass from the outside of the second mentioned envelope inwardly through openings in the second mentioned envelope into contact with the first mentioned envelope.

4. The method of impregnating an absorbent envelope of insulating material surrounding an electrical conductor and in turn surrounded by an envelope which ordinarily impedes passage of the impregnating material, which method comprises causing the second mentioned envelope to expand with respect to the said first mentioned envelope, and subjecting the assemblage in such condition to impregnating insulating material to cause the latter to pass from the outside of the second mentioned envelope inwardly through openings in the second mentioned envelope into contact with the first mentioned envelope.

5. The method of impregnating an absorbent envelope of insulating material surrounding an electrical conductor and in turn surrounded by an envelope which ordinarily impedes passage of the impregnating material, which method comprises causing the first mentioned envelope to contract with respect to the second mentioned envelope, causing the second mentioned envelope to expand with respect to said first mentioned envelope, and subjecting the assemblage in such condition to impregnating insulating material to cause the latter to pass from the outside of the second mentioned envelope inwardly through openings in the second mentioned envelope into contact with the first mentioned envelope.

6. The method of impregnating an absorbent envelope of fibrous insulating material consisting of a helically wound band of paper surrounding an electrical conductor and in turn surrounded by an envelope which ordinarily impedes passage of the impregnating material, which method comprises causing the first mentioned envelope to contract with respect to the second mentioned envelope by the application of dry heat, causing the second mentioned envelope to expand with respect to said first mentioned envelope, subjecting the assemblage in such condition to impregnating liquid insulating material to cause the latter to pass from the outside of the second mentioned envelope inwardly through openings in the second mentioned envelope into contact with the first mentioned envelope, causing the first mentioned envelope to expand, and causing the second mentioned envelope to contract, by cooling.

In testimony whereof I hereto affix my signature.

WILLIAM A. DEL MAR.